(12) United States Patent
Baek et al.

(10) Patent No.: US 6,509,943 B2
(45) Date of Patent: Jan. 21, 2003

(54) REFLECTIVE LIQUID CRYSTAL DISPLAY DEVICE

(75) Inventors: Heum-II Baek, Seoul (KR); Yong-Beom Kim, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 166 days.

(21) Appl. No.: 09/780,613

(22) Filed: Feb. 12, 2001

(65) Prior Publication Data

US 2001/0038429 A1 Nov. 8, 2001

(30) Foreign Application Priority Data

Feb. 12, 2000 (KR) .............................................. 00-6653

(51) Int. Cl.$^7$ .............................................. G02F 1/136
(52) U.S. Cl. .......................................... 349/113; 349/42
(58) Field of Search .............................. 349/113, 42, 43, 349/122, 138; 257/59, 72

(56) References Cited

U.S. PATENT DOCUMENTS

| | | | |
|---|---|---|---|
| 5,208,690 A | * | 5/1993 | Hayashi et al. ............. 257/347 |
| 6,284,558 B1 | * | 9/2001 | Sakamoto .................... 438/29 |
| 6,373,540 B1 | * | 4/2002 | Munakata ................... 349/110 |
| 6,407,784 B1 | * | 6/2002 | Kanou et al. ............... 349/113 |
| 6,441,873 B2 | * | 8/2002 | Young ......................... 257/59 |

* cited by examiner

Primary Examiner—Kenneth Parker
(74) Attorney, Agent, or Firm—Morgan, Lewis & Bockius LLP

(57) ABSTRACT

The present invention provides an array substrate for use in reflective LCD device that has a plurality of concave holes. Each concave hole acts as a drain contact hole and as means of increasing the reflective area of a reflective electrode. The array substrate includes a substrates having a pixel region; a gate line arranged in a transverse direction on the substrate and defining the pixel region; a data line arranged in a longitudinal direction over the substrate and defining the pixel region with the gate line; a thin film transistor (TFT) comprised of a source electrode, a drain electrode and a gate electrode, wherein the source electrode is extended from the data line, wherein the gate electrode is extended from the gate line, and wherein the drain electrode is spaced apart from the source electrode; an auxiliary drain electrode extended from the drain electrode and formed in the pixel region; a passivation layer having a plurality of concave holes, each concave hole exposing a portion of the auxiliary drain electrode; and a reflective electrode formed on the passivation layer, the reflective electrode contacting the auxiliary drain electrode via a plurality of concave holes.

5 Claims, 5 Drawing Sheets

REFLECTIVE LIQUID CRYSTAL DISPLAY DEVICE

This application claims the benefit of Korean Patent Application No. 2000-6653, filed on Feb. 12, 2000, under 35 U.S.C. §119, the entirety of which is hereby incorporated by reference.

BACKGROUND OF THE INVENTION

1. Field of the Invention

The present invention relates to a liquid crystal display (LCD) device. More particularly, the present invention relates to an array substrate for use in a reflective LCD device.

2. Description of Related Art

Until now, the cathode-ray tube (CRT) has been developed for and is mainly used for the display systems. However, the flat panel display is beginning to make its appearance due to the requirement of the small depth dimensions, undesirably low weight and low voltage power supply. At this point, the thin film transistor-liquid crystal display (TFT-LCD) having a high resolution and small depth dimension has been developed.

During operation of the TFT-LCD, when a pixel is turned ON by switching elements, the pixel transmits light generated from a backlight device. The switching elements are generally amorphous silicon thin film transistors (a-Si:H TFTs) which have an amorphous semiconductor layer. Advantageously, the amorphous silicon TFTs can be formed on low cost glass substrates using low temperature processing.

In general, the TFT-LCD transmits and image using light from the back light device that is positioned under the TFT-LCD panel. However, the TFT-LCD only employs 3~8% of the incident light generated from the backlight device, i.e., the inefficient optical modulation.

FIG. 6 shows a light transmittance respectively measured after light passes through each layers of a conventional liquid crystal display device.

The two polarizers have a transmittance of 45% and, the two substrates have a transmittance of 94%. The TFT array and the pixel electrode have a transmittance of 65%, and the color filter has a transmittance of 27%. Therefore, the typical transmissive TFT-LCD device has a transmittance of about 7.4% as seen in GRAPH 1, which shows a transmittance (in brightness %) after light passes through each layer of the device. For this reason, the transmissive TFT-LCD device requires a high, initial brightness, and thus electric power consumption by the backlight device increases. A relatively heavy battery is needed to supply a sufficient power to the backlight of such a device. Moreover, there still exists a problem that the battery cannot be used for a long time.

In order to overcome the problem described above, the reflective TFT-LCD has been developed. Since the reflective TFT-LCD device uses ambient light, it is light and easy to carry. Also, the reflective TFT-LCD device is superior in aperture ratio, compared to the transmissive TFT-LCD device. Namely, since the reflective TFT-LCD includes an opaque reflective material in the pixel of the conventional transmissive TFT-LCD, it reflects the ambient light.

Referring to the attached drawings, a reflective TFT-LCD device that is manufactured by a conventional method will now be explained in some detail.

In general, the TFT-LCD device includes a lower substrate, referred to as an array substrate, and an upper substrate, referred to as a color filter substrate.

FIG. 1 is a plan view illustrating one pixel of a conventional reflective TFT-LCD panel. An Nth gate line 8 and (N−1)th gate line 6 are arranged in a transverse direction in a matrix type. An Mth data line 2 and a (M+1)th data line 4 are arranged in a longitudinal direction in a matrix type as well. A gate electrode 18 is extended from the Nth gate line 8. A source electrode 12 is extended from the Mth data line 2 and overlaps one end portion of the gate electrode 18. A drain electrode 14 is spaced apart from the source electrode 12 and overlaps the other end portion of the gate electrodes 18. The drain electrode 14 also electrically contacts a reflective electrode 10 via a drain contact hole 16. The reflective electrode 10 has a plurality of convex surfaces 20 that reduce mirror effect and that increase a reflective area when the reflective electrode 10 reflects the ambient light. The reflective electrode 10 is made of an opaque metallic material such that it has an effect of reflecting light like a mirror. Thus, as forming a plurality of convex surfaces 20 that irregularly reflects the incident light, the mirror effect is lowered.

Referring to FIGS. 2A to 2D that are cross-sectional views taken along line II—II of FIG. 1, the reference will now explain a plurality of the convex surfaces 20 in detail.

FIG. 2A shows a step of forming a gate electrode 18 by depositing and then patterning a first metal layer. The first metal layer is deposited on a substrate 1 by a sputtering process. The first metal layer is a material selected from a group consisting of Chrome (Cr), Molybdenum (Mo), Aluminum (Al), Titanium (Ti), Tin (Sn), Tungsten (W) and Copper (Cu).

FIG. 2B shows a step of forming a thin film transistor (TFT). A gate insulation layer 30 is formed on the substrate 1 and over the gate electrode 18. The gate insulation layer 30 is made of silicon nitride ($SiN_x$) or silicon oxide ($SiO_2$). Then a semiconductor layer is deposited and patterned to form an island-shaped semiconductor layer 32 as an active layer. Source and drain electrodes 12 and 14 are formed by depositing and then patterning a second metal layer. Thus, the TFT is complete. Namely, the TFT is comprised of the gate electrode 18, the gate insulation layer 30, the island-shaped semiconductor layer 32, the source electrode 12 and the drain electrode 14. After that, a passivation layer 34 is formed over the TFT and on the gate insulation layer 30 in order to protect the TFT and to form a plurality of convex surfaces in a later step. At this time, since the passivation layer 34 has to have the convex surfaces 20 (see FIG. 1), the passivation layer 34 is sufficiently thick. In other aspect, the passivation layer 34 can be a double-layer.

FIG. 2C shows a step of forming a plurality of convex surfaces 20. As shown, the passivation layer 34 is patterned to form the convex surfaces 20. Thus, the thickness of the passivation layer 34 becomes thin. After that, patterning the passivation layer 34 forms a drain contact hole 16 that exposes a portion of the drain electrode 14.

FIG. 2D shows a step of forming a reflective electrode 10 as a pixel electrode. As shown, the reflective electrode 10 is formed on the passivation layer 34 by depositing and patterning the reflective conductive material. Thus, the reflective electrode 10 contacts the drain electrode 14 via the drain contact hole 16. Further, the reflective electrode 10 covers the convex surfaces 20, and causes scattered reflection when the ambient light is irradiated.

FIG. 3 is an enlarged view illustrating a portion "A" of FIG. 2D and shows a convex surface 20 of conventional reflective TFT-LCD device. As shown, the convex surface 20 increases the reflective area of the reflective electrode 10, and irregularly reflects the incident light 40.

As described above, since the reflective TFT-LCD device does not use the backlight device, the battery can be used for a long time. Namely, the reflective TFT-LCD device reflects the ambient light on the reflective electrode 10 and then uses the reflected light to display the image.

However, in the conventional reflective LCD device described above, the passivation layer 34 is patterned twice to form a plurality of convex surfaces 20 and to form the drain contact hole 16 that electrically connects the drain electrode 14 to the reflective electrode 10. Namely, the convex surfaces 20 is formed by patterning the passivation layer 34, and then the passivation layer 34 is additionally patterned to form the drain contact hole 16 that exposes a portion of the drain electrode 14. These are disadvantages of fabricating the reflective LCD device.

As above-mentioned, the conventional reflective LCD device needs separate patterning processes to form the convex surfaces and the drain contact hole. Thus, misalignment can be caused in a process of manufacturing the reflective LCD device and the manufacturing yields can decrease.

SUMMARY OF THE INVENTION

Accordingly, the present invention is directed to a reflective LCD array substrate that substantially overcomes one or more of the problems due to limitations and disadvantages of the related art.

To overcome the problems described above, a preferred embodiment of the present invention provides a reflective LCD array substrate that increases the throughput and the manufacturing yields.

Additional features and advantages of the invention will be set forth in the description that follows, and in part will be apparent from that description, or may be learned by practice of the invention. The objectives and other advantages of the invention will be realized and attained by the structure particularly pointed out in the written description and claims hereof as well as the appended drawings.

In order to achieve the above object, the preferred embodiment of the present invention provides an array substrate for use in reflective liquid crystal display (LCD) device, including: a substrates having a pixel region; a gate line arranged in a transverse direction on the substrate and defining the pixel region; a data line arranged in a longitudinal direction over the substrate and defining the pixel region with the gate line; a thin film transistor (TFT) comprised of a source electrode, a drain electrode and a gate electrode, wherein the source electrode is extended from the data line, wherein the gate electrode is extended from the gate line, and wherein the drain electrode is spaced apart from the source electrode; an auxiliary drain electrode extended from the drain electrode and formed in the pixel region; a passivation layer having a plurality of concave holes, each concave hole exposing a portion of the auxiliary drain electrode; and a reflective electrode formed on the passivation layer, the reflective electrode contacting the auxiliary drain electrode via a plurality of concave holes.

The auxiliary drain electrode is spaced apart from the gate and data lines.

Each concave hole has a shape of a circle. Moreover, each concave hole can have a shape of an oval or a shape of a polygon.

It is to be understood that both the foregoing general description and the following detailed description are exemplary and explanatory and are intended to provide further explanation of the invention as claimed.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to the preferred embodiment of the present invention, example of which is illustrated in the accompanying drawings.

Figure 1:
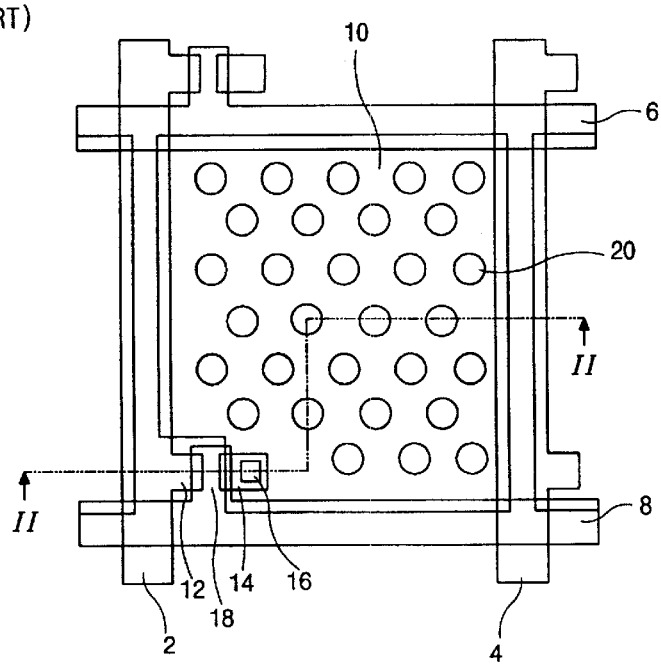
FIG. 1 is a plan view illustrating one pixel of a conventional reflective TFT-LCD panel.
Figure 2A:
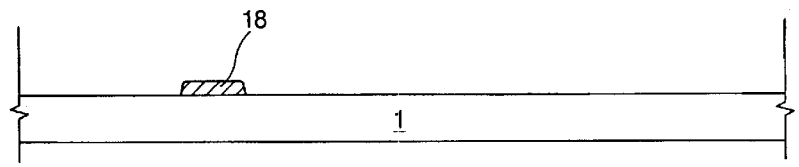
FIGS. 2A to 2D are cross-sectional views taken along line—of FIG. 1 and illustrates process steps of fabricating an array substrate of the conventional reflective LCD panel.
Figure 2B:
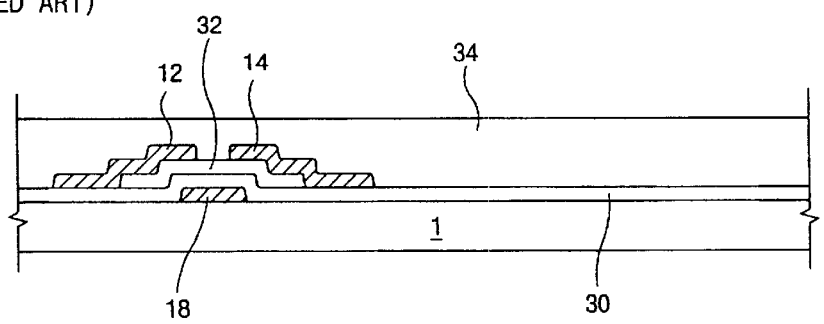
Figure 2C:
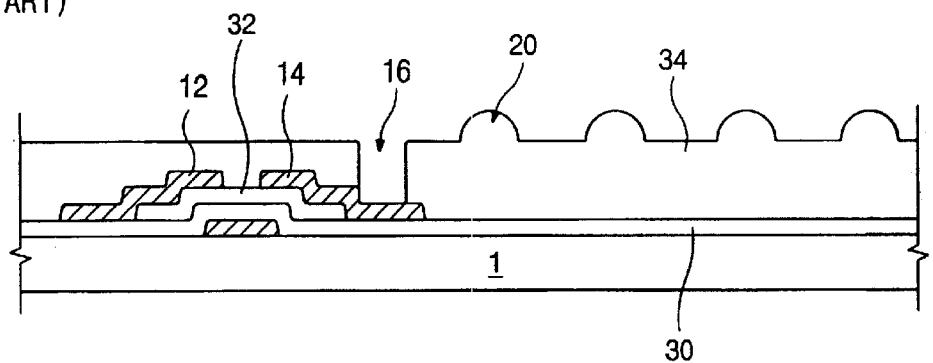
Figure 2D:
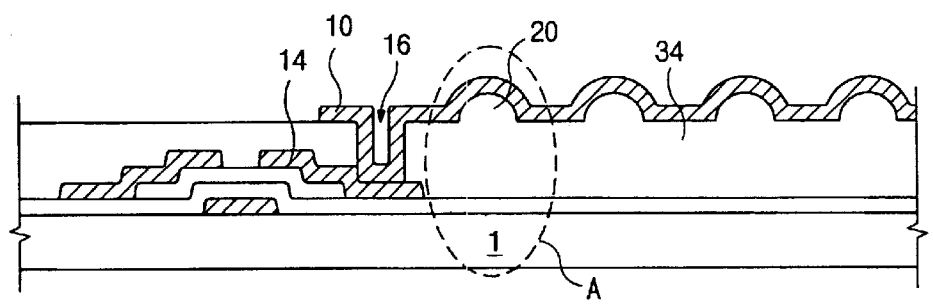
Figure 3:
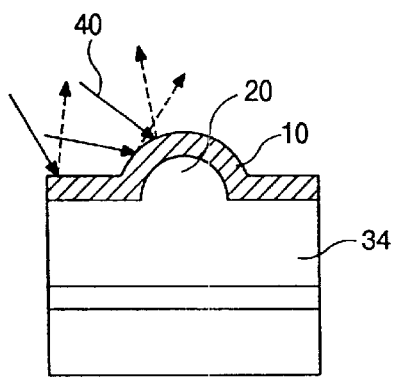
FIG. 3 is an enlarged view illustrating a portion "A" of FIG. 2D.
Figure 4:
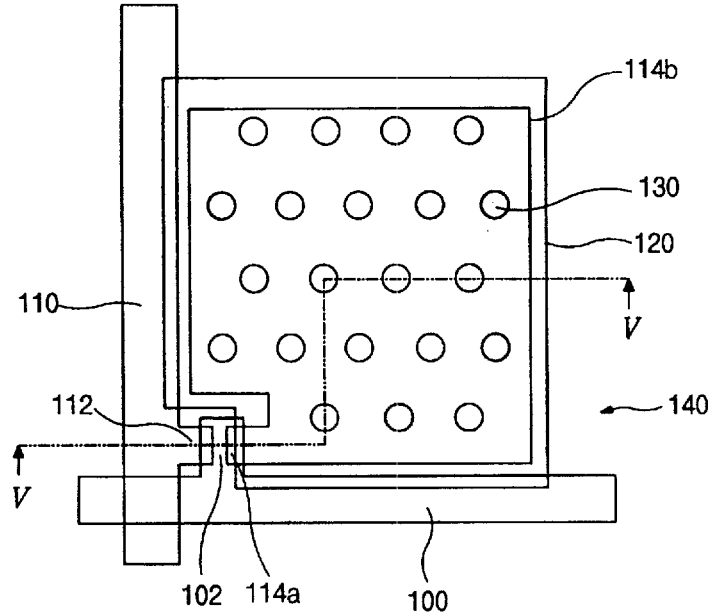
FIG. 4 is a plan view illustrating one pixel of a reflective TFT-LCD panel according to a preferred embodiment of the present invention.

FIG. 4 is a plan view of a reflective TFT-LCD panel according to a preferred embodiment of the present invention. As shown, a gate line 100 is arranged in a transverse direction in a matrix type and a data line 110 is arranged in a longitudinal direction in a matrix type as well. The gate and data lines 100 and 110 define a pixel region 140. A gate electrode 102 is extended from the gate line 100. A source electrode 112 is extended from the data line 110 and overlaps one end portion of the gate electrode 102. A drain electrode 114a is spaced apart from the source electrode 112 and overlaps the other end portion of the gate electrodes 102. An auxiliary drain electrode 114b is extended from the drain electrode 114a and formed in the pixel region 140. A plurality of concave holes 130 are formed in the pixel region 140. And a reflective electrode 120 is arranged over the auxiliary drain electrode 114b and contacts the auxiliary drain electrode 114b via the concave holes 130. Moreover, the auxiliary drain electrode 114b is spaced apart from the gate and data lines 100 and 110.

Still referring to FIG. 4, a drain contact hole does not exist in a preferred embodiment of the present invention, compared to the conventional art. To electrically connect the reflective electrode 120 with the drain electrode 114a, the auxiliary drain electrode 114b is used. Namely, a plurality of concave holes 130 are formed to expose portions of the auxiliary drain electrode 114b. The reflective electrode 120 then contacts the auxiliary drain electrode 114b via the concave holes 130. Thus, the reflective electrode 120 is electrically connected to the drain electrode 114a through the auxiliary drain electrode 114b. At this time, a plurality of concave holes 130 act as the drain contact holes and as means of increasing a reflective area of the reflective electrode 120. Thus, a plurality of concave holes 130 is equal to the drain contact hole in the present invention. Meanwhile, each concave hole 130 formed over the auxiliary drain electrode 114b has a shape of a circle as shown in FIG. 4.

Moreover, the concave holes 130 can have a shape of an oval or a shape of a polygon.

FIGS. 5A to 5D are cross-sectional views taken along line—of FIG. 4 and illustrates process steps of fabricating an array substrate for use in the reflective LCD device according to the preferred embodiment of the present invention.

Figure 5A:
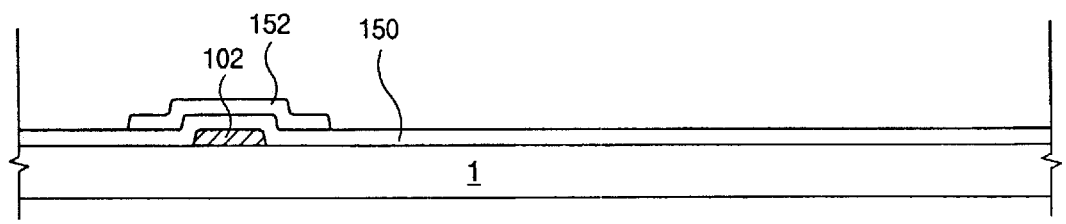
FIGS. 5A to 5D are cross-sectional views taken along line—of FIG. 4 and illustrates process steps of fabricating an array substrate according to the preferred embodiment of the present invention.

Referring to FIG. 5A, a gate electrode 102 is formed on a substrate 1 by depositing and then patterning a first metal layer. After that, a gate insulation layer 150 is formed on the substrate 1 and over the gate electrode 102. The gate insulation layer 150 is made of silicon nitride ($SiN_x$) or silicon oxide ($SiO_2$). And then a semiconductor layer is deposited and patterned to form an active layer 152. The active layer 152 is comprised of an intrinsic semiconductor layer and an extrinsic semiconductor layer which are subsequently piled up. The intrinsic semiconductor layer is made of an amorphous silicon and the extrinsic semiconductor layer is made of an $n^+$ amorphous silicon.

Figure 5B:
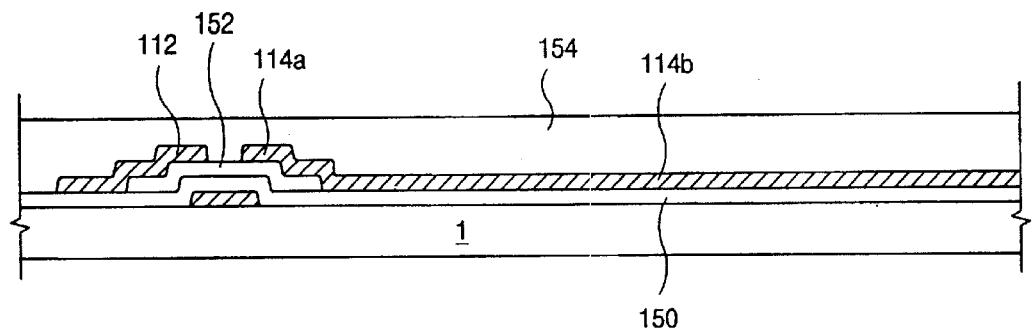

Referring to FIG. 5B, source and drain electrodes 112 and 114a are formed on the active layer 152 by depositing and then patterning a second metal layer. Thus, the TFT is complete. Moreover, when forming the source and drain electrodes 112 and 114a, formed is an auxiliary drain electrode 114b that is connected to the drain electrode 114a at the same time. A passivation layer 154 is formed over the TFT and on the auxiliary drain electrode 114b. The passivation layer 154 is made of an organic insulation layer such as BCB (benzocyclobutene) or acryl, and it has a dielectric permittivity less than 3. The passivation layer 154 protects the active layer 152 from the external impact and from the humidity. And the passivation layer 154 will have a plurality of concave holes in a later step.

Figure 5C:
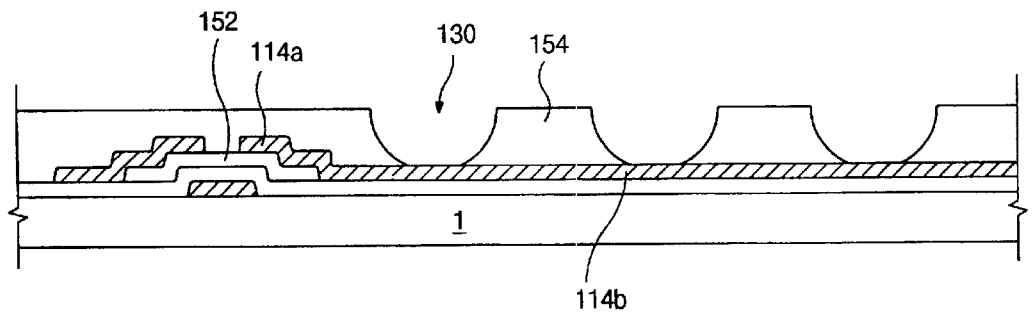

FIG. 5C shows a step of forming a plurality of concave holes 130 in the passivation layer 154. The concave holes 130 expose portions of the auxiliary drain electrode 114b, and each concave hole 130 has a shape of semicircle as shown in FIG. 5C. The semicircle shape is achieved by the peculiar etching property of the organic insulation layer. When etching the passivation layer 154 to form the concave holes 130, the size of the hole is big in the beginning of the etching due to the large etching ratio. But, the size of the hole becomes smaller in the latter period of the etching because the etching ratio becomes lower while performing the etching process.

Figure 5D:
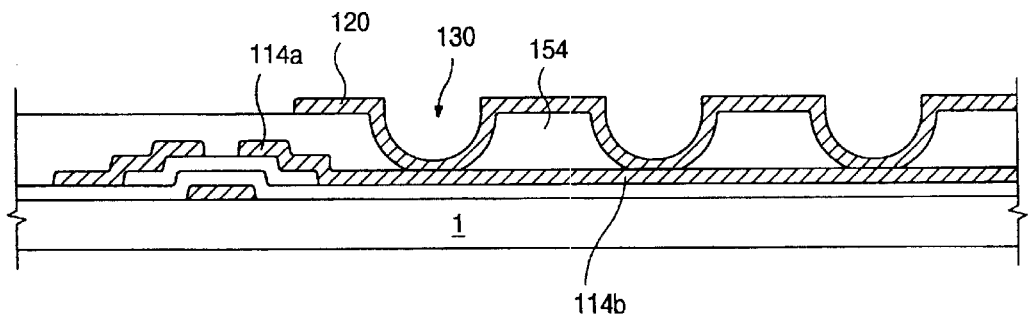
Figure 6:
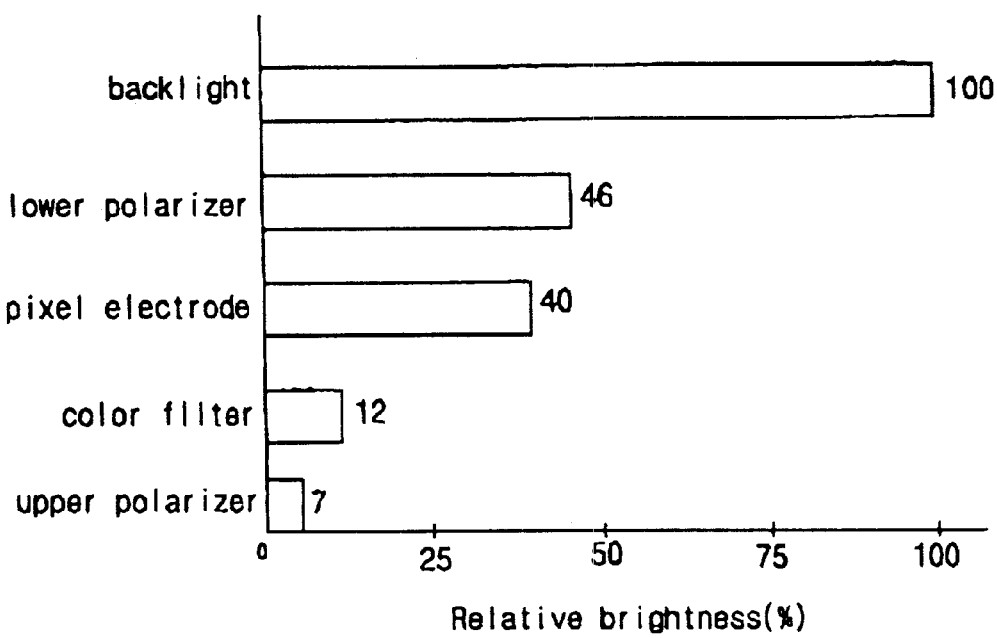
FIG. 6 is a graph illustrating a transmittance respectively measured after light passes through each layer of a conventional liquid crystal display device (LCD).

FIG. 5D show a step of forming a reflective electrode 120 as a pixel electrode. As shown, a third metallic material is deposited and patterned on the passivation layer 154 to form a reflective electrode 120. The reflective electrode 120 contacts the auxiliary drain electrode 114b via the concave holes 130. Thus, the drain contact hole is not needed in the reflective LCD device according to the present invention, compared to the conventional art. Namely, a plurality of concave holes 130 act as the drain contact holes and as means of increasing a reflective area of the reflective electrode 120.

As described above, since the drain contact hole is not required and the concave holes act as means of increasing a reflective area of the reflective electrode, the present invention decreases process steps. The patterning process is not performed twice to form the drain contact hole and to form the concave holes. Therefore, the throughput and the manufacturing yields increase.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. An array substrate for use in reflective liquid crystal display (LCD) device comprising:

a substrate having a pixel region;

a gate line arranged in a transverse direction on the substrate and defining the pixel region;

a data line arranged in a longitudinal direction over the substrate and defining the pixel region with the gate line;

a thin film transistor (TFT) comprised of a source electrode, a drain electrode and a gate electrode, wherein the source electrode is extended from the data line, wherein the gate electrode is extended from the gate line, and wherein the drain electrode is spaced apart from the source electrode;

an auxiliary drain electrode extended from the drain electrode and formed in the pixel region;

a passivation layer having a plurality of concave holes, each concave hole exposing a portion of the auxiliary drain electrode; and a reflective electrode formed on the passivation layer, the reflective electrode contacting the auxiliary drain electrode via a plurality of concave holes.

2. The array substrate according to claim 1, wherein the auxiliary drain electrode is spaced apart from the gate and data lines.

3. The array substrate according to claim 1, wherein each concave hole has a shape of a circle.

4. The array substrate according to claim 1, wherein each concave hole has a shape of an oval.

5. The array substrate according to claim 1, wherein each concave hole has a shape of a polygon.

* * * * *